TRANSMISSION LINE DISTORTION CORRECTION

Filed Feb. 6, 1953 2 Sheets-Sheet 1

INVENTOR
R. W. KETCHLEDGE
BY
Ralph J. Holcomb
ATTORNEY

INVENTOR
R. W. KETCHLEDGE
BY
Ralph T. Holcomb
ATTORNEY

United States Patent Office 2,753,526

Patented July 3, 1956

2,753,526

TRANSMISSION LINE DISTORTION CORRECTION

Raymond W. Ketchledge, Middlesex, N. J., assignor to Bell Telephone Laboratories, Incorporated, New York, N. Y., a corporation of New York Application February 6, 1953, Serial No. 335,478

26 Claims. (Cl. 333—28)

This invention relates to wave transmission networks and more particularly to a method and means for determining the proper adjustment of an adjustable attenuation or delay equalizer associated with a signal transmission system.

An object of the invention is to provide data for adjusting an adjustable attenuation or delay equalizer in such a form as to avoid trial and error.

A second object is to increase the speed and accuracy of equalizer adjustment.

A third object is to permit the simple adjustment of an equalizer whose shapes correspond to one or more terms of a Fourier series.

A fourth object is to permit the simple adjustment of equalizers whose shapes are orthogonal.

A fifth object is to provide an indication of the quality of equalization obtained.

Signal transmission systems, particularly those which transmit a wide frequency band over a considerable distance, suffer from transmission imperfections. These imperfections arise from the inability of the system designer to construct amplifying devices and fixed equalizers which exactly correct for the variations in the attenuation and phase, or delay, characteristics of the system. Furthermore, transmission through the system may be variable due to aging, temperature changes, or other reasons. Therefore, it is necessary to provide the system with adjustable equalizing networks which can be so adjusted as to remove the bulk of the transmission imperfections. Typical attenuation equalizers of this type are described, for example, in a paper entitled "Variable equalizers," by H. W. Bode, in the Bell System Technical Journal, April 1938.

Equalizers introduce shapes which, in general, interact in the sense that each of several shapes may control the transmission of a particular frequency. By shape is meant the change in the attenuation or the delay of the network as a function of frequency. Thus, it is difficult to determine the best setting of the various equalizer shapes since many combinations of settings will yield good equalization at a particular frequency.

It has, therefore, become a common practice to use shapes which interact as little as possible in the sense of frequency overlap of the shapes. While this eases the adjustment problem by making the transmission of a particular frequency primarily dependent upon a particular equalizer control or shape, it also tends to degrade performance because broad overlapping shapes generally yield far more accurate equalization. Thus, one object of the present invention is to remove the restrictions on the choice of practical equalizer shapes.

In the past, manual equalizers have been adjusted by taking the system out of service, measuring its transmission, adjusting the equalizers, remeasuring the transmission, readjusting, and continuing the process until the desired transmission is obtained. For a complex equalizer with many controls, this takes considerable time because of the trial-and-error nature of the process. On the other hand, the present invention permits the direct determination of the required equalizer adjustments and thereby eliminates trial and error.

Broadly, the invention comprises an adjustable equalizer having one or more orthogonalized shapes associated with a signal transmission line, means for converting the transmission characteristic of the combination into a repetitive voltage variation, and means responsive to this voltage variation for determining when the equalizer is in optimum adjustment. In the embodiments disclosed, by way of example only, the voltage variation is obtained by applying a periodic sweep-frequency voltage to one end of the combination of line and equalizer and detecting the received voltage at the other end to provide a repetitive voltage variation corresponding to the attenuation or delay deviations in the combination. This detected voltage characteristic is then analyzed for either its harmonic or its power content to obtain an indication of the equalization error, which is made use of in improving the equalizer adjustment. As shown, the received voltage is impressed upon an audible indicator or a power meter, or filtered and impressed upon a voltmeter or power meter. This indication may be utilized at once as a criterion in the manual adjustment of the equalizer, recorded for later use, or applied through suitable means to the equalizer controls to effect an automatic adjustment.

The nature of the invention and its various objects, features, and advantages will appear more fully in the following detailed description of preferred embodiments illustrated in the accompanying drawing, of which Fig. 1 is a block diagram of an equalizer-adjusting circuit in accordance with the invention for either attenuation or delay equalization;

Fig. 2 is a schematic circuit, partly in block, of a sweep source suitable for use in the circuit shown in Fig. 1;

Fig. 3 gives the voltage versus time characteristic of a triangle-wave generator suitable for use in the circuit of Fig. 2;

Figures 1, 2, 6:
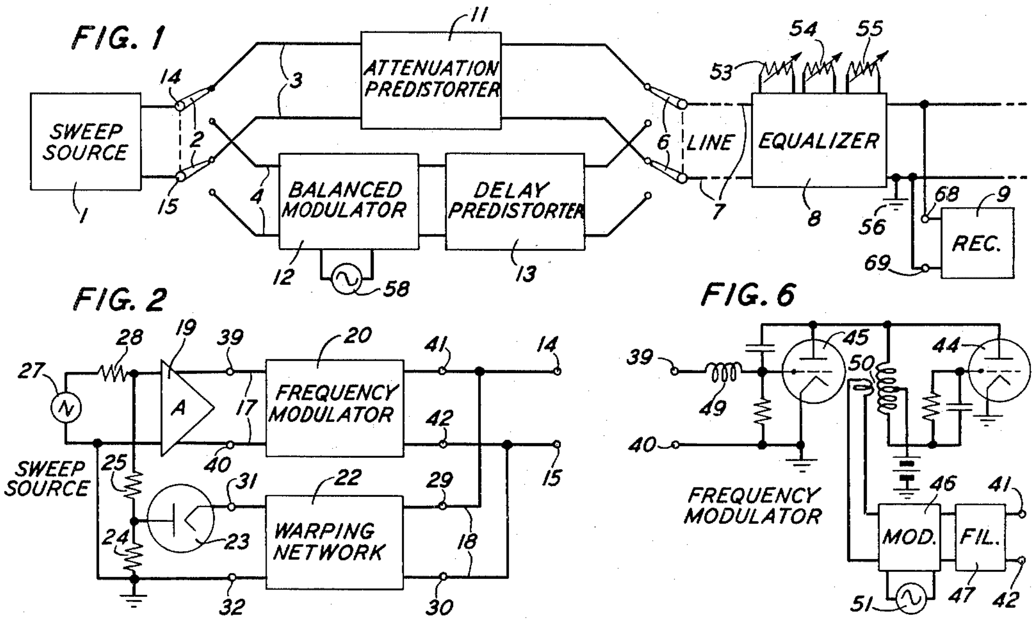
Fig. 6 is a schematic circuit, partly in block, of a frequency modulator suitable for use in the sweep-source circuit shown in Fig. 2.
Figure 10:
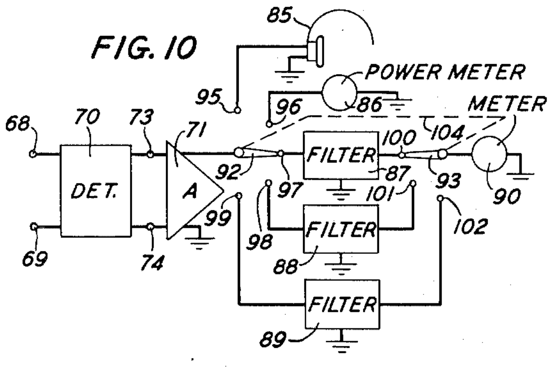
Figure 11:
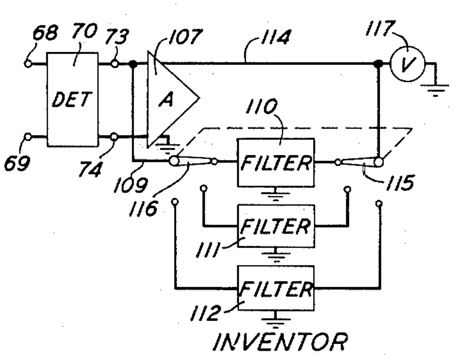
Figure 12:
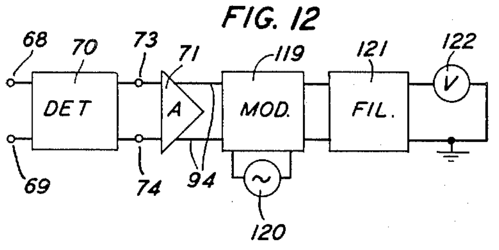
Figure 7:
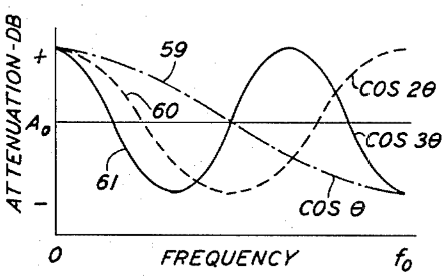
Figure 8:
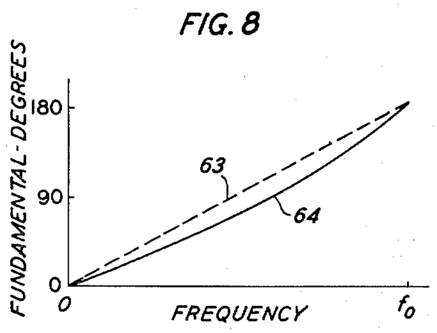
Figure 9:
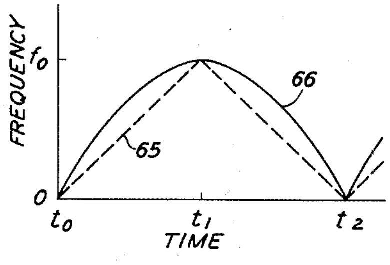
Figure 15:
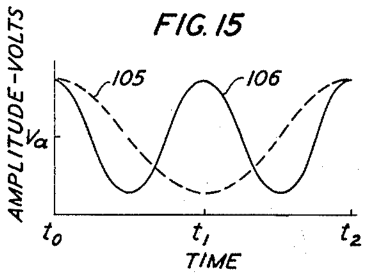
Figure 13:
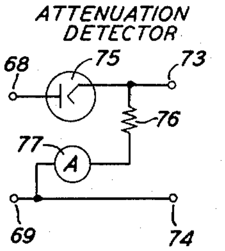
Figure 14:
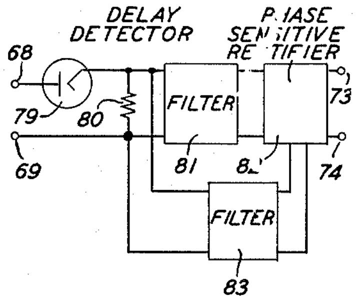

Fig. 7 gives typical attenuation versus frequency characteristics of an attenuation equalizer having three harmonically related cosine shapes suitable for use in the circuit of Fig. 1 for the equalization of attenuation;

Fig. 8 presents graphs of the phase of the fundamental versus frequency for equalizer shapes which are cosine curves on linear or warped frequency scales, respectively;

Fig. 9 shows frequency versus time characteristics for linear and warped scanning, respectively;

Figs. 10, 11, and 12 are block diagrams, respectively, of three receivers suitable for use in the circuit of Fig. 1;

Fig. 13 is a schematic circuit of an attenuation detector suitable for use in the receiver circuits shown in Figs. 10, 11, and 12;

Fig. 14 is a schematic circuit of a delay detector suitable for use in the receiver circuits of Figs. 10, 11, and 12; and Fig. 15 shows graphs of voltage versus time for the detector output corresponding, respectively, to two equalizer shapes.

By way of introduction, some of the theory underlying the invention will be presented. Consider a transmission system provided with a total of N adjustable equalizers. Assume for the moment that the transmission error of the system consists solely of a shape which is a linear combination of the shapes available in the equalizers. There exists, therefore, a setting for each equalizer which, in combination with the others, completely corrects for the transmission error. The required settings can be determined by trial and error, but this inefficient process can be avoided by a process equivalent to the solution of simultaneous equations. These equations are developed on the basis that the sum of the required individual equalizer shapes must equal the total system error at all frequencies. In an actual case where the system error cannot be perfectly corrected using the available equalizer shapes, an exact correction can be obtained only at a limited number of frequencies, and there will be small errors at the frequencies between the match points.

The determination of the required adjustments when one is given a set of equalizer shapes and given a system equalization error may be expressed as follows:

Let the equalizer shapes be given by functions of the form $$S_n(f)=k_nF_n(f) \qquad (1)$$

where the subscript $n$ identifies the particular equalizer; $F_n(f)$ is the equalizer shape, on a unit basis, as a function of the frequency $f$; $k_n$ is a factor corresponding to the amount of shape introduced by the adjustment and may be either positive or negative; and $S_n(f)$ is the resultant shape put in the system by adjusting $F_n(f)$ by an amount $k_n$.

The total shape introduced by all N equalizers is obviously $$S_{total}(f)=\sum_{n=1}^{n=N}S_n(f)=\sum_{n=1}^{n=N}k_nF_n(f) \qquad (2)$$

To obtain a match of $S_{total}$ to the given equalization error, $S_{given}$, at M frequencies from $m=1$ to $m=M$, requires that $$S_{total}(f_m)=S_{given}(f_m) \qquad (3)$$

at each frequency from $f_1$ to $f_M$. Or, in terms of Equation 2, $$S_{given}(f_m)=\sum_{n=1}^{n=N}k_nF_n(f_m) \qquad (4)$$

again, at each frequency from $f_1$ to $f_M$.

Thus, it is clear that a computational operation equivalent to the solution of simultaneous equations can be used to determine the proper equalizer adjustment. The present invention, however, accomplishes this result on a continuous rather than discontinuous frequency scale. The match points are, therefore, not arbitrarily selected frequencies.

Consider, for example, a series of equalizers whose individual shapes correspond, respectively, to the terms of a Fourier series in accordance with the expression $$S_n(f)=k_n\cos n\theta \qquad (5)$$

where the angle $\theta$ varies from zero to 180 degrees over the frequency range to be equalized. The transmission characteristic to be equalized, $S_{given}$, can be expressed as an infinite series of the form $$S_{given}=\sum_{n=0}^{n=\infty}k_n\cos n\theta \qquad (6)$$

In practice, it is found that a finite number of equalizer shapes will generally provide acceptable equalization. In order to adjust the equalizer to compensate for the transmission distortion, it is necessary to find the proper values of the factors $k_n$. This is accomplished, according to one embodiment of the invention, by converting the frequency characteristic of the system into a repetitive time function. This time function is then subjected to a harmonic analysis to obtain a Fourier series in time instead of frequency. A harmonic series in time can be separated into individual terms by ear or by the use of filtering techniques. From each of these terms is obtained a criterion for the proper selection of the corresponding factor $k_n$.

In another embodiment of the invention, the conversion from frequency to time is similar but the power in the error signal is utilized to determine the proper choices of the factors $k_n$. This embodiment is not restricted to equalizers of the Fourier-series type but may be used in conjunction with any set of equalizers whose shapes are orthogonal. Two functions, $f(x)$ and $f'(x)$, are orthogonal over an interval $(a,b)$ if $$\int_a^b f(x)f'(x)dx=0 \qquad (7)$$

that is, if the integral of the product of the functions is zero over the interval.

Taking up the figures in greater detail, Fig. 1 shows the general arrangement of an equalizer-adjusting circuit in accordance with the invention for use with either an attenuation or a delay equalizer. A sweep source 1 is connected, by means of the switches 2 and 6, through one of the two parallel branches 3 and 4 to a signal transmission line or other circuit 7 to be equalized. Included in the line 7 is an adjustable attenuation or delay equalizer 8, followed by a receiver 9. The equalizer 8 is ordinarily located in physical proximity to the receiver 9 so that the equalizer may conveniently be adjusted in accordance with the received error signals. The upper branch 3 includes an attenuation predistorter 11. The lower branch 4 includes a balanced modulator 12 and a delay predistorter 13 connected in tandem. When the equalizer 8 is an attenuation equalizer, the switches 2 and 6 are thrown to the upper position, as shown, so that the sweep source 1 is connected to the line 7 via the upper branch 3. When the equalizer 8 is a delay equalizer, the switches are thrown to the lower position so that the lower branch 4 is in circuit.

Fig. 2 shows a circuit suitable for the sweep source 1 shown in Fig. 1. It should be pointed out that this source need not actually be a sweep-frequency generator, but may generate a series of discrete frequencies, either simultaneously or sequentially. However, in the particular embodiment shown in Fig. 1, a sweep-frequency source is preferred. The function of the source 1 is to provide at the terminals 14, 15 a voltage which is constant in amplitude but varies in frequency in a prescribed manner.

As shown in Fig. 2, the sweep source 1 is a network of the feedback type, comprising a principal or mu circuit 17 and a feedback or beta circuit 18. The mu circuit 17 includes an amplifier 19 followed by a frequency modulatior 20. The beta circuit 18 comprises a warping network 22, a rectifier 23, and a load resistor 24 grounded at one end. The voltage of the triangle generator 27 and that across the load resistor 24 are nearly equal but of opposite sign. These voltages are added algebraically by the resistance network 25, 28 and delivered to the amplifier 19. The amplifier 19 applies the difference of these voltages to the frequency modulator 20. Thus, through the feedback action in the beta circuit 18, the output frequency on the terminals 14, 15 is related in a desired manner to the voltage from the generator 27 by the warping network 22, which determines the relative amount of time the sweep-frequency signal spends in the vicinity of a given frequency. The amount and nature of the desired warping of the frequency-time relationship depends upon the shapes provided by the equalizer 8 and will be discussed in greater detail hereinafter.

Figure 3:
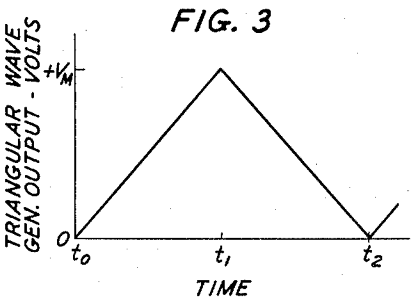

Fig. 3, which is a plot of voltage versus time, shows a suitable output wave for the triangle generator 27. The voltage rises linearly from zero at the time $t_0$ to a maximum value $V_M$ at the time $t_1$, decreases linearly to zero at the time $t_2$, and then repeats the cycle continuously. In certain, but not all, cases it is useful to place $t_1$ midway between $t_0$ and $t_2$.

Figure 4:
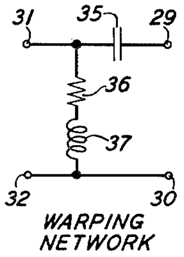
Fig. 4 is a schematic circuit of a warping network suitable for use in the circuit of Fig. 2.

Fig. 4 shows a circuit suitable for the warping network 22 of Fig. 2. The network has a pair of input terminals 29, 30 and a pair of output terminals 31, 32 which correspond, respectively, to the similarly numbered terminals shown in Fig. 2. The circuit comprises a series capacitor 35 between the terminals 29, 31 and a shunt branch constituted by the series combination of a resistor 36 and an inductor 37 connected between the output terminals 31, 32. The values of the elements 35, 36, 37 are so chosen that, for a constant input voltage on the terminals 29, 30, the output voltage on the terminals 31, 32 has the frequency response shown by the curve of Fig. 5. Over a band of frequencies extending, in this case, from zero to $f_0$ the characteristic falls from zero to a maximum negative value of $V_M'$, which is approximately equal to the maximum value $V_M$ of the output voltage from the triangle generator 27, shown in Fig. 3. The output voltage is shown as negative in Fig. 5 to stress the fact that the alternating-current output from the network 22 is applied to the rectifier 23 to produce across the load resistor 24 a direct-current voltage whose polarity is opposite to that of the generator 27. As explained below, the warping network 22 may be omitted in some cases.

Fig. 6 shows a suitable circuit for the frequency modulator 20 of Fig. 2. The input terminals 39, 40 and the output terminals 41, 42 correspond to the similarly designated terminals in Fig. 2. The function of the frequency modulator 20 is to convert the voltage versus time characteristic received from the amplifier 19 into a frequency versus time characteristic of the type shown in Fig. 9. As shown, the circuit comprises an oscillator tube 44, a reactance tube 45, a modulator 46, and a filter 47. The input voltage is impressed upon the grid-cathode circuit of the tube 45 through a choke coil 49. The plate-cathode circuit of the tube 45 is shunted across the tuned circuit of the oscillator tube 44. The reactance tube 45 thus converts a voltage on the input terminals 39, 40 into a reactance which controls the frequency of the oscillator tube 44. The operation of this type of circuit is described in greater detail in "Radio Engineers' Handbook," by F. E. Terman, first edition, 1943, pages 654 and 655. The output of the tube 44 is fed through the coupled coils 50 to modulator 46, which is driven by a fixed-frequency oscillator 51. The combination of the variable-frequency oscillator comprising the tube 44 and associated components, the fixed-frequency oscillator 51, and the modulator 46 constitutes a beat-frequency oscillator. The operation of beat-frequency oscillators is well known and is described, for example, on pages 507, 508, and 509 of the above-mentioned handbook. The modulator 46 may, for example, be of the copper oxide type, such as is shown in Fig. 24 on page 553 of the book cited above. The output from the modulator 46 is passed through the low-pass filter 47 to eliminate the undesired sidebands, and is available at the output terminals 41, 42. In one embodiment of the invention which has been successfully operated, the tube 44 oscillates at frequencies ranging between 70 and 80 megacycles, under the control of the reactance tube 45, the oscillator 51 has a fixed frequency of 80 megacycles, the filter 47 cuts off at 25 megacycles, and the output wave at the terminals 41, 42 is substantially constant in amplitude but varies in frequency cyclically between zero and ten megacycles.

Returning now to Fig. 1, the predistorter 11 or 13 is required only when it is desired that the combination of the line 7 and the equalizer 8 should have a transmission-frequency characteristic which is other than flat or constant. For example, assume that the switches 2 and 6 are in the positions shown, that the attenuation predistorter 11 has a rising loss-frequency characteristic, and that the attenuation equalizer 8 has been adjusted for a flat over-all transmission characteristic. Then, when the attenuation predistorter 11 is removed, the line 7 and the equalizer 8, in combination, will have a falling loss characteristic which is just the inverse of that of the predistorter 11. It is sometimes desirable to provide this, or some other, type of characteristic in order to equalize for transmission distortion known to exist in another part of the system. The delay predistorter 13 may be used to accomplish a similar result when the circuit is used for the equalization of delay.

The function of the balanced modulator 12, in the lower branch 4 which is used in delay equalization, is to change the instantaneous frequency of the sweep source 1 into a pair of frequencies having a constant spacing between them. This constant spacing is termed the interval frequency. It is well known in the art that such a pair of frequencies may be used to determine the delay in a transmission system. Suitable balanced modulator circuits for generating a double sideband wave with carrier suppressed are shown in Fig. 22 on page 551 of the handbook cited above. In one embodiment, when the output from the sweep source 1 varied from zero to ten megacycles, the fixed oscillator 58 had a frequency of 14 kilocycles. The resulting interval frequency is then 28 kilocycles.

Broadly speaking, the function of the portion of the equalizer-adjusting circuit to the left of the switch 6, the components of which have been described in some detail above, is to apply to the line 7 a signal suitable for use in measuring the output of the equalizer 8. As shown, the equalizer 8, to be described more fully hereinafter, has three independently adjustable control elements 53, 54, and 55 shown schematically as variable resistors. It is to be understood, however, that the invention is applicable to equalizers having any number of control elements, including a single one. One side of the equalizer 8 may be grounded, as shown at 56.

The receiver 9, several types of which are described below in connection with Figs. 10, 11, and 12, is connected across the output terminals of the equalizer 8. The output of the receiver 9 is used in determining the required adjustments of the control elements 53, 54, and 55 to effect the desired equalization of the line 7.

To recapitulate, in Fig. 1 a constant-level sweep frequency from the source 1 is sent over the upper branch 3, or converted to a pair of sweep frequencies in the lower branch 4, transmitted over the line 7 and through the equalizer 8, and received at the receiver 9, the output of which is utilized to determine the proper settings for the equalizer 8.

The equalizer 8 of Fig. 1 provides one or more independently adjustable, orthogonal shapes. They may, for example, correspond to the sine or cosine terms of a Fourier series. Fig. 7 shows the attenuation characteristics of three terms of a suitable cosine attenuation equalizer over the frequency range to be equalized, from zero to $f_0$. The curves 59, 60, and 61 correspond, respectively, to the fundamental and the first two harmonics. An infinite series of such terms is capable of describing any continuous function. However, a finite number of terms will provide sufficiently accurate equalization in most cases. In practice, it has been found that 25 terms, that is, 25 equalizer shapes, will give excellent equalization. The flat loss $A_0$ is the characteristic obtained when each of the control elements 53, 54, and 55 is set at the center of its adjustable range. As each control is moved off center, a proportional positive or negative amount of the corresponding cosine shape is introduced into the equalizer 8. Each of the equalizer shapes, therefore, has an attenuation characteristic given by $$S_n(f)=A_0+k_n \cos n\theta \qquad (8)$$

where $\theta$ is the phase angle of the fundamental, $k$ is a numerical constant which depends upon the setting of the control and may be either positive or negative, and $n$ identifies the particular equalizer shape. A suitable cosine equalizer circuit is disclosed in United States Patent 2,348,572, to P. H. Richardson, issued May 9, 1944.

In Fig. 7, the fundamental curve 59, is shown as a true cosine shape and, therefore, its phase $\theta$ is linearly proportional to the frequency $f$, as shown by the broken-line curve 63 in Fig. 8. The broken-line curve 65 of Fig. 9 shows a typical frequency-time characteristic of the output from the sweep source 1 at the terminals 14, 15 when the warping network 22 is omitted. The frequency rises linearly from zero at the time $t_0$ to $f_0$ at $t_1$ and then descends linearly to zero again at $t_2$. This type of scanning characteristic is suitable for use with an equalizer 8 whose phase-frequency characteristic is linear, as shown by the curve 63 of Fig. 8.

Figure 5:
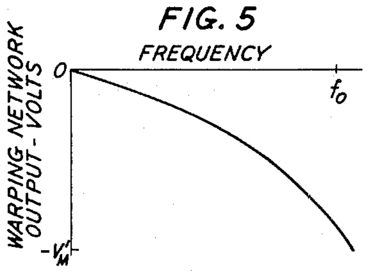
Fig. 5 is a typical output voltage versus frequency characteristic of the warping network shown in Fig. 4.

In some cases, however, it is found that closer equalization is obtainable if the equalizer shapes are distorted cosine curves. The phase-frequency characteristic of the fundamental equalizer shape may, for example, be of the form shown by the solid-line curve 64 of Fig. 8, which is concave upward. In this case, it is advantageous, but not always essential, to warp the frequency scale of the scan, by compressing it at the low frequencies and stretching it at the high frequencies, to compensate for the nonlinearity of the phase-frequency characteristic. This is accomplished by inserting a warping network 22 whose voltage-frequency characteristic, as shown in Fig. 5, corresponds to the phase-frequency curve 64 of Fig. 8, to produce a concave downward scanning characteristic such as shown by the solid-line curve 66 of Fig. 9 and thereby make the variation of the phase versus time characteristic linear.

Figs. 10, 11, and 12 show three alternative circuits suitable for the receiver 9 of Fig. 1. The receiver has a pair of input terminals 68 and 69 connected to a detector 70 which is followed by an alternating-current amplifier 71. The detector 70 is adapted for the detection of attenuation when the circuit of Fig. 1 is being used for the equalization of attenuation, and is adapted for the detection of delay when delay is being equalized. Its function is to convert the received signals into a varying direct voltage. The function of the amplifier 71 is to transmit the variations in this voltage while excluding the constant or average component thereof.

Fig. 13 shows the circuit of an attenuation detector suitable for use in the receivers shown in Figs. 10, 11, and 12 when attenuation is being equalized. In Fig. 13, the input terminals 68, 69 and the output terminals 73, 74 correspond to the similarly designated terminals in Figs. 10, 11, and 12. The attenuation detector comprises a diode rectifier 75 connected between the terminals 68, 73 and an output shunt branch including a load resistor 76 in series with an ammeter 77. The rectifier 75 develops across the resistance 76, and also the output terminals 73, 74, a direct voltage proportional to the amplitude of the signal received at the input terminals 68, 69. The deviations of this voltage at the terminals 73, 74 from its average value represent the transmission, or equalization, error of the line 7 and the attenuation equalizer 8. The ammeter 77 reads the average current through the resistor 76, and thereby indicates the average amplitude of the received signal. This average amplitude provides an indication of whether or not the flat loss of the system is correct.

Fig. 14 shows the circuit of a delay detector suitable for use in the receivers of Figs. 10, 11, and 12 when delay is to be equalized. The delay detector comprises a series diode rectifier 79, a shunt load resistor 80, a filter 81, and a phase-sensitive rectifier 82 whose output is connected to the output terminals 73, 74. The circuit also includes a filter 83 with input connected across the resistor 80 and output connected to the phase-sensitive rectifier 82. A suitable circuit for the phase-sensitive rectifier 82 is disclosed, for example, in my United States Patent 2,434,273, issued January 13, 1948.

The signals received at the input terminals 68, 69 of the delay detector are rectified by the rectifier 79 to produce across the resistor 80 the interval frequency generated by the modulator 12 of Fig. 1. In one embodiment, this interval frequency is 28 kilocycles. This interval frequency is phase modulated by the delay characteristic of the line 7 and the delay equalizer 8 and, in the embodiments shown, this characteristic is repeated in a period equal to the difference between $t_2$ and $t_0$, as shown in Fig. 3. Thus, the interval frequency across the resistor 80 may be described as a carrier and two sidebands, in which the various sideband frequencies are spaced at $1/(t_1-t_0)$ or $1/(t_2-t_1)$ intervals. The filter 83 has a very narrow transmission band which passes only the interval frequency but excludes the sidebands and, therefore, delivers to the phase-sensitive rectifier 82 a carrier wave of constant amplitude and phase. On the other hand, the filter 81 has a transmission band wide enough to pass the difference frequency and all of the important sidebands. Thus, the phase-sensitive rectifier 82 delivers to the output terminals 73, 74 a direct voltage which is a measure of the deviations from a constant delay.

Returning now to Fig. 10, this embodiment of the receiver 9 includes, besides the detector 70 and the amplifier 71 described above, an audible indicator 85, a power meter 86, a series of filters 87, 88, 89, a meter 90, and switches 92, 93. The high-side output of the amplifier 71 is connected to the switch 92, and the meter 90 is connected to the switch 93. The audible indicator 85 and the power meter 86 are connected, respectively, to the terminals 95 and 96 associated with the switch 92. The filters 87, 88, and 89 have their high-side inputs connected, respectively, to the terminals 97, 98, and 99 associated with the switch 92, and their high-side outputs connected, respectively, to the terminals 100, 101, and 102 associated with the switch 93. The switches 92 and 93 are preferably ganged together so that the filters 87, 88, and 89 may be connected sequentially between the amplifier 71 and the meter 90. The switch 92 may be thrown independently to contact the terminals 95 and 96 and thereby connect either the audible indicator 85 or the power meter 86 to the amplifier 71.

In order to explain the operation of the equalizer-adjusting circuit of Fig. 1 when the receiver 9 is of the type shown in Fig. 10, it will be assumed that attenuation is to be equalized. In Fig. 1, then, the switches 2 and 6 will be thrown to the upper position to connect the attenuation predistorter 11 into the circuit and the equalizer 8 will be an attenuation equalizer. It will be further assumed that the equalizer 8 has three controls 53, 54, and 55 which control, respectively, the attenuation characteristics given by the curves 59, 60, and 61 of Fig. 7, and that only the control 53 is misadjusted. The sweep source 1 is repetitively scanning the system with a sweep characteristic assumed to be that shown by the curve 65 of Fig. 9 having a period $t_2-t_0$. The received signal at the output of the detector 70, Fig. 10, will vary in amplitude with time, as shown by the broken-line curve 105 of Fig. 15. During the interval from $t_0$ to $t_1$, the curve 105 follows the curve 59 of Fig. 7 to fall from maximum value to minimum. At the time $t_1$, the sweep frequency reaches its maximum value $f_0$ and then starts to decrease to zero again, as shown in Fig. 9. So, over the interval from $t_1$ to $t_2$, the curve 105 retraces the curve 59 in the opposite direction, thus rising again to maximum. If the intervals $t_1-t_0$ and $t_2-t_1$ are equal, the curve 105 is a cosine wave of time having an average amplitude $V_a$ and a frequency $f_1$ given by $$f_1=1/(t_2-t_0) \qquad (9)$$

The current through the resistor 76 corresponding to the voltage $V_a$ may be read on the ammeter 77, Fig. 13.

In the equalizer 8, if the control 54 instead of 53 is not properly adjusted, the received signal at the amplifier 71, Fig. 10, will be a cosine wave of the type shown by the solid-line curve 106 of Fig. 15, having a frequency $f_2$ equal to $2f_1$. Similarly, a misadjustment of the control 55 will result in a received error signal of frequency $f_3$ equal to $3f_1$. If two or more of the controls 53, 54, and 55 are out of adjustment at the same time, the error signals corresponding thereto will be received simultaneously. It is thus seen that the attenuation mismatches caused by misadjustments of the equalizer shapes, which are cosines of frequency, are converted at the receiver 9 into a series of error signals which are harmonically related cosines of time. Furthermore, there is a correspondence between the degree of mismatch and the amplitude of the corresponding error signal. It follows, therefore, that if the controls 53, 54, and 55 are adjusted one at a time until all of the received error signals have been eliminated or reduced to a minimum, the equalizer 8 will be properly set to provide the desired equalization for the transmission line 7.

In an embodiment of the invention which has been successfully tested on a broad-band coaxial cable system, a scanning frequency $f_1$ of 37 cycles per second has been used. The attenuation equalizer 8 provides 25 harmonically related shapes, one of which is flat, corresponding to the zero harmonic. When all of the shapes are misadjusted, the alternating-current output of the amplifier 71 consists of a frequency $f_1$ of 37 cycles and the first 24 harmonics thereof, making the highest received frequency 888 cycles per second. The equalizer 8 is in correct adjustment when the received output no longer contains any frequencies between 37 and 888 cycles and the ammeter 77 reads a value of current previously determined.

Returning again to the receiver shown in Fig. 10, the function of the portion of the circuit to the right of the switch 92 is to determine from the error-signal output of the amplifier 71 which controls of the equalizer 8 must be adjusted, and in which direction, to obtain the desired equalization. This determination may be made by means of the audible indicator 85 which may be connected to the amplifier 71 by throwing the switch 92 to engage the contact 95. The audible indicator 85, which may be a headphone or a loudspeaker, converts the error-signal harmonics into corresponding tones which are heard by the operator. These error-frequency tones are then eliminated one at a time by adjusting the corresponding equalizer controls such as 53, 54, and 55. When none of these tones can be heard or at least are minimized, the equalizer 8 is in proper adjustment. When using audible detection, a scanning rate, $f_1$, of at least 100 cycles per second is preferred, because of the loss of sensitivity of the human ear at frequencies below this. Also, it has been observed from experience that it is helpful first to misadjust greatly the particular control under adjustment, in order to increase the loudness of the pitch associated with that control. Then, with this particular pitch in mind, the control is adjusted to minimize that harmonic. In laboratory tests, it has been found that musical training makes very little difference in the operator's ability to use the audible method of adjustment skillfully.

In Fig. 10, the switch 92 may be thrown to the contact 96 to connect the power meter 86 to the amplifier 71 and thus provide another method of adjustment. The meter 86 may be an ordinary wattmeter or it may be of the thermistor or electronic type. This meter indicates the total power output of the amplifier 71. As any one of the controls 53, 54, and 55 is adjusted more nearly to its proper setting, the total received power is reduced. In this method, therefore, the equalizer controls are adjusted, one after another, to minimize the power reading on the meter 86. It is important to note that this method is equally useful with any type of equalizer shapes which are orthogonal or which can be made effectively orthogonal by the use of warped scanning. For example, any equalizer shapes which do not overlap on the frequency scale are orthogonal for any scan warp and can be easily adjusted by this method. Also, the reading on the power meter 86 is a measure of the root-mean-square equalization error and thus constitutes a convenient indication of the quality of the equalization which has been obtained at the completion of the equalizer adjustment. For example, a power reading corresponding to a deviation of 0.1 decibel or less in the attenuation, or a deviation of 0.1 microsecond or less in the delay, usually indicates that the line 7 is satisfactorily equalized for television transmission.

Another method of adjustment available with the receiver of Fig. 10 involves separating the error-signal output from the amplifier 71 into bands of frequencies by means of band-pass filters such as 87, 88, and 89. These filters may be connected, one at a time, between the amplifier 71 and the meter 90 by means of the ganged switches 92 and 93. There may, for example, be a sufficient number of filters to filter out each harmonic in the error signal. In this case, each of the filters 87, 88 and 89 has a narrow band which passes only one of the harmonic frequencies $f_1$, $f_2$, and $f_3$, while excluding the others. The meter 90, in this case, is an alternating-current voltmeter which reads the voltage associated with the harmonic passed by the filter in circuit at the time. The corresponding equalizer control is adjusted for a minimum reading on the meter 90. When each of the controls 53, 54, and 55 has been adjusted, in turn, for a minimum voltage reading, the equalizer 8 is in proper adjustment.

Alternatively, each of the filters 87, 88, and 89 may transmit more than one of the harmonic frequencies. For example, if there are 24 harmonics, the filter 87 may pass the lowest ten harmonics, the filter 88 the remaining ones, and the filter 89 all 24 of them. In this case, the meter 90 is preferably a power meter such as the meter 86. The equalizer 8 is in proper adjustment when the controls corresponding to the transmitted harmonics have been adjusted one at a time for a minimum reading on the meter 90. This partial filtering technique reduces the switching required for adjusting a multi-control equalizer, while still retaining high accuracy.

Fig. 11 shows an alternative circuit for the receiver 9 of Fig. 1. The detector 70 may be the same as the one shown in Fig. 10. The amplifier 107 may also be the same as the amplifier 71 of Fig. 10 except that a feedback connection 109 is provided. The filtering is provided by the band-elimination filters 110, 111, and 112 which may be connected one at a time into the feedback path from the output lead 114 to the connection 109. The ganged switches 115 and 116 permit connecting the desired filter into the feedback path. The mid-band frequencies of the filters 110, 111, and 112 correspond, respectively, to the harmonic frequencies $f_1$, $f_2$, and $f_3$. The frequency transmitted by an amplifier corresponds to the frequency suppressed in the feedback path. Therefore, the amplifier 107 may, in effect, be tuned to pass any one of the frequencies $f_1$, $f_2$, or $f_3$ by choosing the proper filter. The voltmeter 117 indicates the received error signal. With the amplifier 107 tuned to the corresponding frequency, the equalizer controls 53, 54, and 55 are adjusted one at a time for a minimum reading on the meter 117.

Another alternative receiver circuit is shown in Fig. 12. The detector 70 and amplifier 71 may be the same as shown in Fig. 10. In this case, however, the filtering of the harmonic frequencies present in the output of the amplifier 71 is accomplished by means of a superheterodyne detector comprising a modulator 119, an adjustable beat oscillator 120, a filter 121, and a voltmeter 122. The filter 121 has a narrow, fixed pass band. The signals from the amplifier 71 are modulated by the modulator 119 to a new band of frequencies, the location of which is controlled by the frequency of the oscillator 120. By properly setting the frequency of the oscillator 120, any received harmonic may be modulated to the frequency passed by the filter 121. In this way, the error signals corresponding to the various equalizer controls may be selected one at a time and the voltage read on the meter 122. The equalizer 8 has been properly adjusted when each control has been set for minimum reading on the meter 122.

It is to be understood that the above-described arrangements are illustrative of the applicaiton of the principles of the invention. Numerous other arrangements may be devised by those skilled in the art without departing from the spirit and scope of the invention.

What is claimed is:

1. In combination, a transmission path having undesired transmission distortion over a range of frequencies, an equalizer connected in tandem with said path, said equalizer having a plurality of harmonically related, independently adjustable shapes adapted to correct said distortion over said range, means for converting the over-all frequency characteristic of said path and said equalizer into a Fourier series in time the individau terms of which furnish, respectively, criteria for the proper individual adjustment of said shapes to correct said distortion, and means for detecting individually the amplitudes of the frequencies representing said terms.

2. The combination in accordance with claim 1 in which said equalizer is adapted for the equalization of attenuation distortion in said path.

3. The combination in accordance with claim 1 in which said equalizer is adapted for the equalization of delay distortion in said path.

4. The combination in accordance with claim 1 in which said last-mentioned means include an audible indicator.

5. The combination in accordance with claim 1 in which said last-mentioned means include a power meter.

6. The combination in accordance with claim 1 in which said last-mentioned means include a voltmeter.

7. The combination in accordance with claim 1 which includes an attenuation predistorter associated with said path.

8. The combination in accordance with claim 1 which includes a delay predistorter associated with said path.

9. The combination in accordance with claim 1 in which said first-mentioned means include a source of voltage of substantially constant amplitude which repetitively sweeps over said frequency range.

10. In combination, a transmission path having a transmission versus frequency characteristic which exhibits undesired distortion over a range of frequencies, an equalizer connected in tandem with said path, said equalizer having a plurality of independently adjustable shapes adapted to correct said distortion over said range, means for converting the over-all transmission characteristic of said path and said equalizer into an orthogonal set of repetitive voltage variations the individual terms of which correspond, respectively, to the individual adjustment errors of said shapes, and means responsive to the individual amplitudes of said terms for indicating when said equalizer is best adjusted to correct said distortion.

11. The combination in accordance with claim 10 in which said equalizer is adapted for the equalization of attenuation distortion in said path over said range.

12. The combination in accordance with claim 10 in which said equalizer is adapted for the equalization of delay distortion in said path over said range.

13. The combination in accordance with claim 10 in which said equalizer shapes are orthogonally related.

14. The combination in accordance with claim 13 in which said shapes are harmonically related.

15. The combination in accordance with claim 13 in which said shapes are harmonically related cosine curves.

16. The combination in accordance with claim 10 in which said first-mentioned means include a balanced modulator.

17. The combination in accordance with claim 10 in which said last-mentioned means include an audible indicator.

18. The combination in accordance with claim 10 in which said last-mentioned means include a power meter.

19. The combination in accordance with claim 10 in which said last-mentioned means include a voltmeter.

20. The combination in accordance with claim 10 which includes an attenuation predistorter associated with said line.

21. The combination in accordance with claim 10 which includes a delay predistorter associated with said line.

22. The combination in accordance with claim 10 in which said equalizer shapes are harmonically related cosine curves and said terms are also harmonically related cosine curves.

23. The combination in accordance with claim 22 in which said indicating means comprise a plurality of band-pass filters and means for connecting said filters into circuit one at a time.

24. The combination in accordance with claim 22 in which said indicating means comprise an amplifier with a feedback path, a plurality of band-elimination filters, and means for connecting said filters into said feedback path one at a time.

25. The combination in accordance with claim 22 in which said indicating means comprise a superheterodyne detector.

26. In a system comprising the tandem-connected combination of a transmission line having transmission distortion and a distortion equalizer therefor having a plurality of individually adjustable shapes, the method of adjusting said equalizer to compensate for said distortion which includes the steps of converting the over-all transmission characteristic of the line and equalizer into an orthogonal set of repetitive voltage variations the individual terms of which correspond, respectively, to the individual adjustment errors of said shapes, and individually detecting the amplitudes of said terms.

References Cited in the file of this patent

UNITED STATES PATENTS

| | | |
|---|---|---|
| 2,465,531 | Green | Mar. 29, 1949 |
| 2,617,855 | Etheridge | Nov. 11, 1952 |
| 2,625,614 | Schelleng | Jan. 13, 1953 |
| 2,632,792 | Selz | Mar. 24, 1953 |